(12) United States Patent
Nakata et al.

(10) Patent No.: US 12,247,793 B2
(45) Date of Patent: *Mar. 11, 2025

(54) HEAT EXCHANGER

(71) Applicant: FUJITSU GENERAL LIMITED, Kanagawa (JP)

(72) Inventors: Shohei Nakata, Kanagawa (JP); Yoshinari Maema, Kanagawa (JP); Kotaro Oka, Kanagawa (JP)

(73) Assignee: FUJITSU GENERAL LIMITED, Kanagawa (JP)

( * ) Notice: Subject to any disclaimer, the term of this patent is extended or adjusted under 35 U.S.C. 154(b) by 202 days.

This patent is subject to a terminal disclaimer.

(21) Appl. No.: 17/909,887

(22) PCT Filed: Mar. 4, 2021

(86) PCT No.: PCT/JP2021/008550
§ 371 (c)(1),
(2) Date: Sep. 7, 2022

(87) PCT Pub. No.: WO2021/192903
PCT Pub. Date: Sep. 30, 2021

(65) Prior Publication Data
US 2023/0094694 A1    Mar. 30, 2023

(30) Foreign Application Priority Data

Mar. 23, 2020    (JP) ................. 2020-051124

(51) Int. Cl.
*F28F 9/02*    (2006.01)
*F28D 7/16*    (2006.01)
(Continued)

(52) U.S. Cl.
CPC .............. *F28D 7/1653* (2013.01); *F28F 1/04* (2013.01); *F28F 9/02* (2013.01); *F28F 9/0204* (2013.01); *F25B 39/028* (2013.01)

(58) Field of Classification Search
CPC ...... F28F 9/0204; F28F 9/0214; F25B 39/028
See application file for complete search history.

(56) References Cited

U.S. PATENT DOCUMENTS 7,284,594 B2    10/2007    Sanada et al.
2018/0073819 A1*    3/2018    Kim ................. F28F 9/028
(Continued)

FOREIGN PATENT DOCUMENTS

| CN | 102767922 A | 11/2012 |
| CN | 104422200 A | 3/2015 |

(Continued)

OTHER PUBLICATIONS

Feb. 22, 2024, European Search Report issued for related EP Application No. 21774514.0.
(Continued)

*Primary Examiner* — Eric S Ruppert
(74) *Attorney, Agent, or Firm* — Paratus Law Group, PLLC

(57) ABSTRACT

A heat exchanger includes a plurality of flat heat transfer tubes and a header, wherein, in an interior portion of each of the plurality of flat heat transfer tubes, a plurality of upwind side channels and a plurality of downwind side channels are formed, the header includes a main body portion in which an interior portion space connected to the plurality of upwind side channels and the plurality of downwind side channels is formed, a partition member that divides the interior portion space into an upwind side space, and a flow inlet/outlet port that supplies a refrigerant to a lower part of the upwind side space, and, at a lower part of the partition member, a lower communication path that communicates the downwind side space and the upwind side space is formed.

5 Claims, 12 Drawing Sheets

(51) Int. Cl.
*F28F 1/04* (2006.01)
*F25B 39/02* (2006.01)

(56) References Cited

U.S. PATENT DOCUMENTS

| | | | | |
|---|---|---|---|---|
| 2021/0018190 A1* | 1/2021 | Hirokawa | ............. | F28F 9/0204 |
| 2022/0316804 A1 | 10/2022 | Onaka et al. | | |
| 2023/0094694 A1 | 3/2023 | Nakata et al. | | |
| 2023/0108901 A1* | 4/2023 | Nakata | ................. | F28F 9/0265 |
| | | | | 165/175 |

FOREIGN PATENT DOCUMENTS

| | | | |
|---|---|---|---|
| CN | 115280092 A | 11/2022 | |
| CN | 115298507 A | 11/2022 | |
| EP | 3425320 A1 | 1/2019 | |
| EP | 3425321 A1 | 1/2019 | |
| EP | 3473963 A1 | 4/2019 | |
| EP | 3647711 A1 | 5/2020 | |
| JP | H03-140795 A | 6/1991 | |
| JP | 2016-114282 A | 6/2016 | |
| JP | 2016-125748 A | 7/2016 | |
| JP | 2017-044428 A | 3/2017 | |
| JP | 2018-100800 A | 6/2018 | |
| JP | 2018-162900 A | 10/2018 | |
| JP | 6664558 B1 | 3/2020 | |
| WO | WO 2017/149989 A1 | 9/2017 | |
| WO | WO 2017/150126 A1 | 9/2017 | |
| WO | WO-2018116929 A1 * | 6/2018 | ............. F25B 39/00 |
| WO | WO 2019/026436 A1 | 2/2019 | |

OTHER PUBLICATIONS

Aug. 8, 2024, Australian Office Action issued for related AU Application No. 2021241109.
Oct. 1, 2024, Chinese Office Action issued for related CN Application No. 202180020733.X.
Oct. 1, 2024, Chinese Office Action issued for related CN Application No. 202180021247.X.
Chen et al., Development of Compact Heat Exchanger of CO2 Motor Vehicle Air-Conditioning, 2001, pp. 9-12, vol. 22, No. 1.
Feb. 22, 2024, European Search Report issued for related EP Application No. 21774084.4.

* cited by examiner

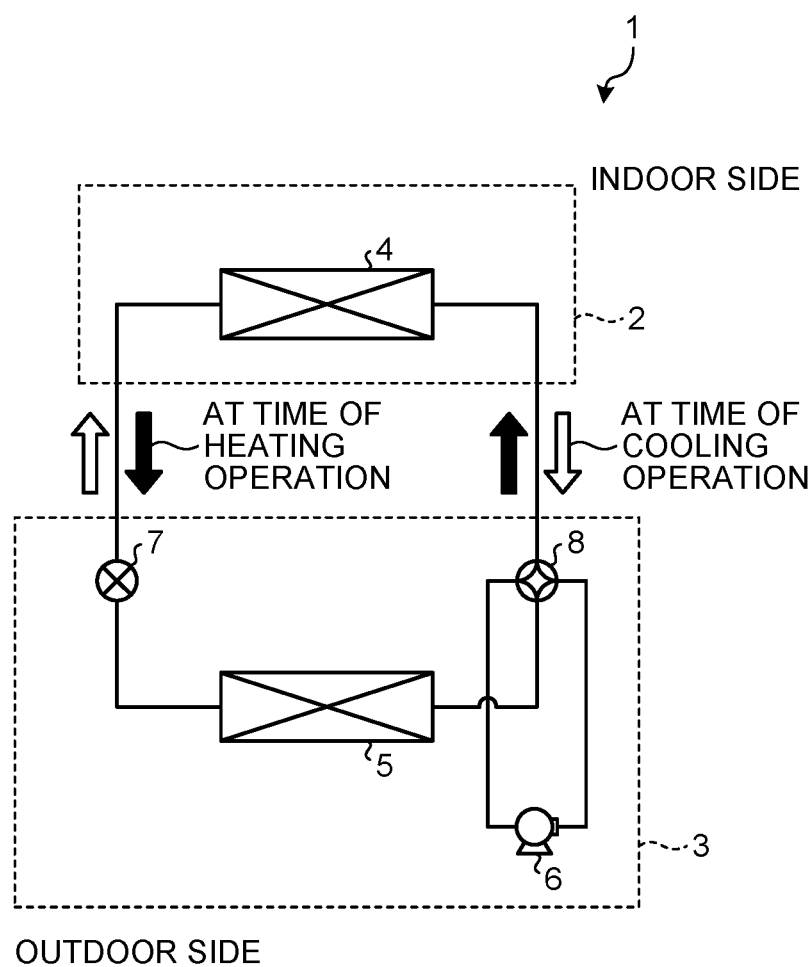

HEAT EXCHANGER

CROSS REFERENCE TO PRIOR APPLICATION

This application is a National Stage Patent Application of PCT International Patent Application No. PCT/JP2021/008550 (filed on Mar. 4, 2021) under 35 U.S.C. § 371, which claims priority to Japanese Patent Application No. 2020-051124 (filed on Mar. 23, 2020), which are all hereby incorporated by reference in their entirety.

FIELD

The present invention relates to a heat exchanger.

BACKGROUND

There is a known heat exchanger in which both ends of flat heat transfer tubes having a plurality of channels are inserted into and connected to each of two headers and that performs branching of a flow of a refrigerant from one of the headers to the flat heat transfer tubes (Patent Literature 1).

In an air conditioner, a refrigerant that enters a gas phase state from a gas-liquid two-phase state on the way passing through the heat exchanger used as an evaporator flows out in an overheated state on an outlet side. In the overheated refrigerant, a temperature difference $\Delta T$ with air is smaller as compared to a case in which the refrigerant is in a gas-liquid two-phase state, so that a heat exchange amount $\phi$ ($=K*\Delta T*A$, where K denotes a coefficient of overall heat transfer and A denotes a heat transfer area) with air is decreased. Furthermore, if the degree of dryness of a refrigerant at an outlet of the heat exchanger falls below 1.0, an average value of the degree of dryness of the refrigerant passing through the heat exchanger is decreased, as compared to a case in which the degree of dryness of the refrigerant that has passed through the heat exchanger is 1.0. If the average value of the degree of dryness of the refrigerant passing through the heat exchanger is low, a flow velocity of the refrigerant is decreased, so that a heat transfer coefficient on the refrigerant side is increased. If the heat transfer coefficient on the refrigerant side is high, the coefficient of overall heat transfer K between the refrigerant and air is decreased, and thus, the heat exchange amount $\phi$ between the refrigerant and the air is decreased. Accordingly, it is ideal that, when an evaporator is used as a heat exchanger, a refrigerant circulation volume is adjusted such that the degree of dryness of the refrigerant passing through the heat exchanger is just 1.0.

CITATION LIST

Patent Literature

Patent Literature 1: Japanese Laid-open Patent Publication No. 2018-100800

SUMMARY

Technical Problem

In contrast, if heat exchange between external air and a refrigerant is performed by using the above described heat exchanger, a temperature difference between the flowing air and the channel that is located on the upwind side of the flat heat transfer tubes is large, and thus, a heat exchange amount is large. Accordingly, when a heat exchanger is used as, for example, an evaporator, only the refrigerant flowing through the channel located on the upwind side in the flat heat transfer tubes enters a gas phase state, and this gas phase refrigerant may sometimes become overheated state. In contrast, in order to prevent the refrigerant flowing through the channel that is located on the upwind side from being evaporated and becoming an overheated state, it is conceivable to allow the refrigerant in which the degree of dryness is low to flow into the flat heat transfer tubes. However, the channel located on the downwind side in the flat heat transfer tubes is a channel that has a heat exchange amount smaller than that in the channel located on the upwind side in the flat heat transfer tubes. As a result, heat exchange between the air and the refrigerant flowing through the channel located on the downwind side in the flat heat transfer tubes is insufficient, and thus, the degree of dryness of the refrigerant that has passed through the subject channel is lower than 1.0. In this case, as compared to an ideal case in which the refrigerant circulation volume is adjusted such that the degree of dryness of the refrigerant that has passed through the heat exchanger is just 1.0, there is a problem in that the coefficient of overall heat transfer K between the refrigerant and the air is decreased and the heat exchange amount $\phi$ with the air is decreased accordingly.

Accordingly, the disclosed technology has been conceived in light of the circumstances described above and an object thereof is to provide a heat exchanger that suppresses a decrease in a heat exchange amount between air and a refrigerant.

Solution to Problem

According to an aspect of an embodiment, a heat exchanger includes a plurality of flat heat transfer tubes that are disposed in an area in which air flows, and a header that is bonded to end portions of the plurality of flat heat transfer tubes, wherein in an interior portion of each of the plurality of flat heat transfer tubes, a plurality of upwind side channels, and a plurality of downwind side channels disposed closer to a downwind side of the air than the a plurality of upwind side channels are formed, the header includes a main body portion in which an interior portion space connected to the plurality of upwind side channels and the plurality of downwind side channels is formed, a partition member that divides the interior portion space into an upwind side space located on a side closer to end portions of the plurality of upwind side channels and a downwind side space located on a side closer to end portions of the plurality of downwind side channels, and a flow inlet/outlet port that supplies a refrigerant to a lower part of the upwind side space and that discharges the refrigerant from the lower part of the upwind side space, and at a lower part of the partition member, a lower communication path that communicates the downwind side space and the upwind side space is formed.

Advantageous Effects of Invention

The disclosed heat exchanger is able to suppress a decrease in the heat exchange amount between the air and the refrigerant.

BRIEF DESCRIPTION OF DRAWINGS

FIG. 1 is a diagram illustrating a configuration of an air conditioner in which heat exchangers according to a first embodiment of the present invention are applied.

DESCRIPTION OF EMBODIMENTS

Figure 2A:
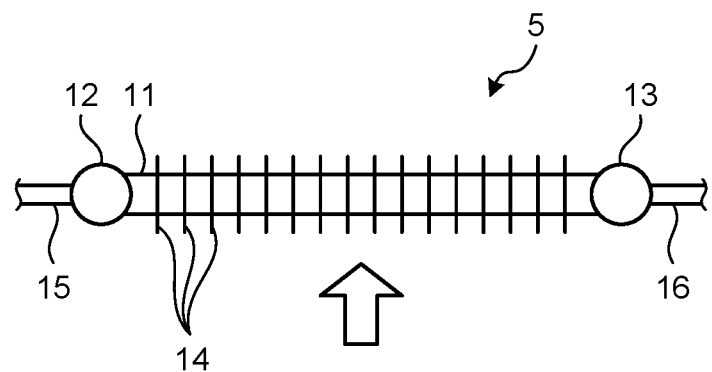
FIG. 2A is a plan view illustrating the heat exchanger according to the first embodiment of the present invention.

In the following, modes for carrying out the present invention (hereinafter, referred to as "embodiments") will be described with reference to accompanying drawings. In addition, components that are the same as those in the embodiments are assigned the same reference numerals.

First Embodiment

Air Conditioner

FIG. 1 is a diagram illustrating a configuration of an air conditioner 1 in which a heat exchanger 4 and a heat exchanger 5 according to a first embodiment of the present invention is applied. As illustrated in FIG. 1, the air conditioner 1 includes an indoor unit 2 and an outdoor unit 3. The indoor unit 2 is provided with the heat exchanger 4 for an indoor use, whereas the outdoor unit 3 is provided with, in addition to the heat exchanger 5 for an outdoor use, a compressor 6, an expansion valve 7, and a four-way valve 8.

At the time of a heating operation, a high-temperature high-pressure gas refrigerant discharged from the compressor 6 included in the outdoor unit 3 flows into the heat exchanger 4 that functions as a condenser via the four-way valve 8. At the time of the heating operation, a refrigerant flows in the direction indicated by the black arrow illustrated in FIG. 1. In the heat exchanger 4, a gas refrigerant flowing in is subjected to heat exchange with external air and is liquefied. The liquefied high pressure refrigerant is decompressed after passing through the expansion valve 7 and flows, as a low-temperature low-pressure gas-liquid two-phase refrigerant, into the heat exchanger 5 that functions as an evaporator. In the heat exchanger 5, the gas-liquid two-phase refrigerant flowing in is subjected to heat exchange with external air and is gasified. The gasified low pressure refrigerant is taken into the compressor 6 via the four-way valve 8.

At the time of a cooling operation, a high-temperature high-pressure gas refrigerant discharged from the compressor 6 included in the outdoor unit 3 flows into the heat exchanger 5 that functions as a condenser via the four-way valve 8. At the time of the cooling operation, the refrigerant flows in the direction indicated by the white arrow illustrated in FIG. 1. In the heat exchanger 5, the gas refrigerant flowing in is subjected to heat exchange with external air and is liquefied. The liquefied high pressure refrigerant is decompressed after passing through the expansion valve 7 and flows, as a low-temperature low-pressure gas-liquid two-phase refrigerant, into the heat exchanger 4 that functions as an evaporator. In the heat exchanger 4, the gas-liquid two-phase refrigerant flowing in is subjected to heat exchange with external air and is gasified. The gasified low pressure refrigerant is taken into the compressor 6 via the four-way valve 8.

Heat Exchanger

Figure 2B:
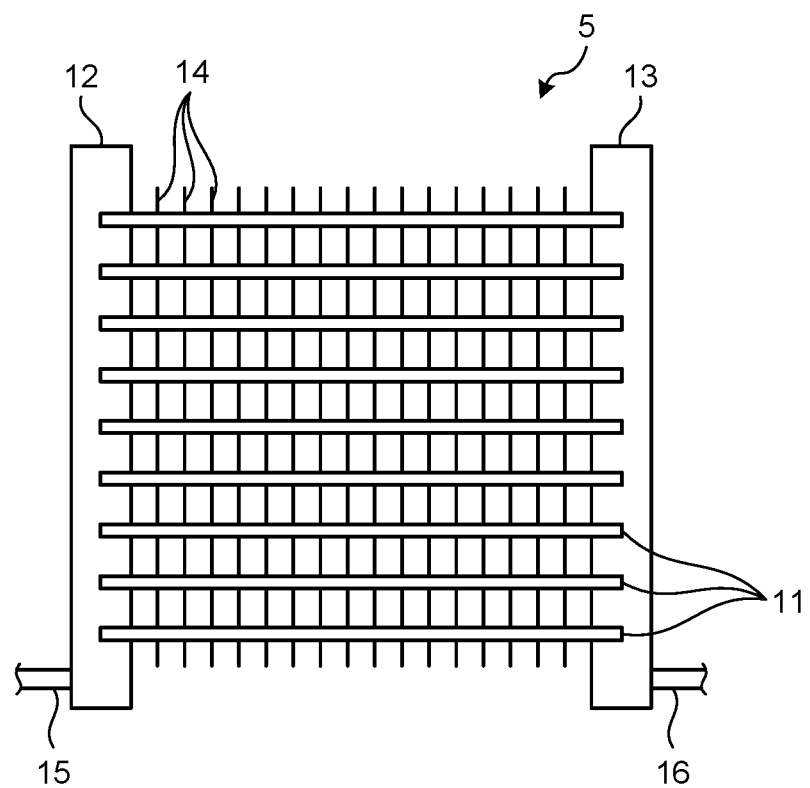
FIG. 2B is a front view illustrating the heat exchanger according to the first embodiment of the present invention.

The heat exchanger according to the first embodiment of the present invention is applicable to both of the heat exchanger 4 and the heat exchanger 5; however, in the following, a description will be made with the assumption that the heat exchanger according to the first embodiment is applied to the heat exchanger 5 that functions as an evaporator at the time of the heating operation. FIG. 2A and FIG. 2B are diagrams each illustrating the heat exchanger 5 according to the first embodiment of the present invention, FIG. 2A is a plan view of the heat exchanger 5, and FIG. 2B is a front view of the heat exchanger 5.

The heat exchanger 5 includes a plurality of flat heat transfer tubes 11 in which wider surfaces are laminated so as to face with each other and through which a refrigerant flows, a header 12 to which an end portion of each of the plurality of flat heat transfer tubes 11 is connected and that has a tubular shape and that branches the flow of the refrigerant into the plurality of flat heat transfer tubes 11, a header 13 to which the other end of each of the plurality of flat heat transfer tubes 11 is connected and that has a tubular shape and that joins the refrigerants flowing out from the plurality of flat heat transfer tubes 11, and a plurality of fins 14 each of which has a plate shape and is bonded to the respective plurality of flat heat transfer tubes 11. The plurality of flat heat transfer tubes 11 extend in a direction that is indicated by the arrow illustrated in FIG. 2A and that is perpendicular to the direction in which external air flows and have a flat shape in cross section. Here, the external air flows by ventilation supplied by a fan that is not illustrated. The plurality of flat heat transfer tubes 11 includes a plurality of channels extending in the same direction as the direction in which the flat heat transfer tubes extend to the interior portion. As illustrated in FIG. 2B, the plurality of flat heat transfer tubes 11 are laminated in a vertical direction such that the flat surfaces (wider surfaces) out of the side surfaces face each other, and the end portions located on the left and right sides are connected to the header 12 and the header 13, respectively. Furthermore, the plurality of fins 14 are disposed between the header 12 and the header 13 so as to be perpendicular to the plurality of flat heat transfer tubes 11. The low-temperature low-pressure gas-liquid two-phase refrigerant that is decompressed after passing through the expansion valve 7 is supplied to the header 12 by a pipe 15 and is branched off and flows into each of the plurality of flat heat transfer tubes 11. At the tie of flowing through the plurality of flat heat transfer tubes 11, the gas-liquid two-phase refrigerant that has been subjected to heat exchange with air via the fins 14 is gasified and flows out to the header 13, and then, the gas refrigerant that has been joined at the header 13 is taken into the compressor via a pipe 16 and the four-way valve 8.

Flat Heat Transfer Tube

Figure 3:
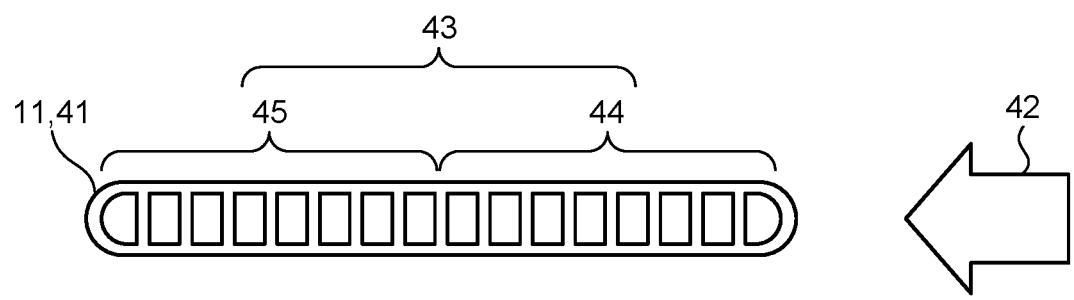
FIG. 3 is a front view illustrating a flat heat transfer tube included in the heat exchanger according to the first embodiment of the present invention.

A flat heat transfer tube 41 that is one of the plurality of flat heat transfer tubes 11 is disposed, as illustrated in FIG. 3, in a space through which air flows in a flow direction 42 that is perpendicular to the vertical direction in which the plurality of flat heat transfer tubes 11 is laminated. FIG. 3 is a front view illustrating the flat heat transfer tube 41 included in the heat exchanger according to the first embodiment of the present invention. The flat heat transfer tube 41 is formed in a belt shape that is substantially flat. The straight line parallel to the longitudinal direction of the flat heat transfer tube 41 is substantially perpendicular to the flow direction 42 and is substantially perpendicular to the vertical direction. The plane parallel to the wider surface of the flat heat transfer tube 41 is substantially perpendicular to the vertical direction, that is, substantially parallel to the flow direction 42. In the interior portion of the flat heat transfer tube 41, a plurality of channels 43 parallel to the flow direction 42 are formed. The plurality of channels 43 includes a plurality of upwind side channels 44 that are located at a position closer to the upwind side than the center of the flat heat transfer tube 41 in the width direction in cross section and a plurality of downwind side channels 45 that are located at a position closer to the downwind side than the center of the flat heat transfer tube 41 in the width direction in cross section. The plurality of downwind side channels 45 are disposed at a position closer to the downwind side than the plurality of upwind side channels 44. The other flat heat transfer tubes that are different from the flat heat transfer tube 41 included in the plurality of flat heat transfer tubes 11 are also formed in the same manner as the flat heat transfer tube 41 and are disposed such that the direction in which the plurality of channels 43 are aligned is parallel to the flow direction 42.

Header

Figure 4:
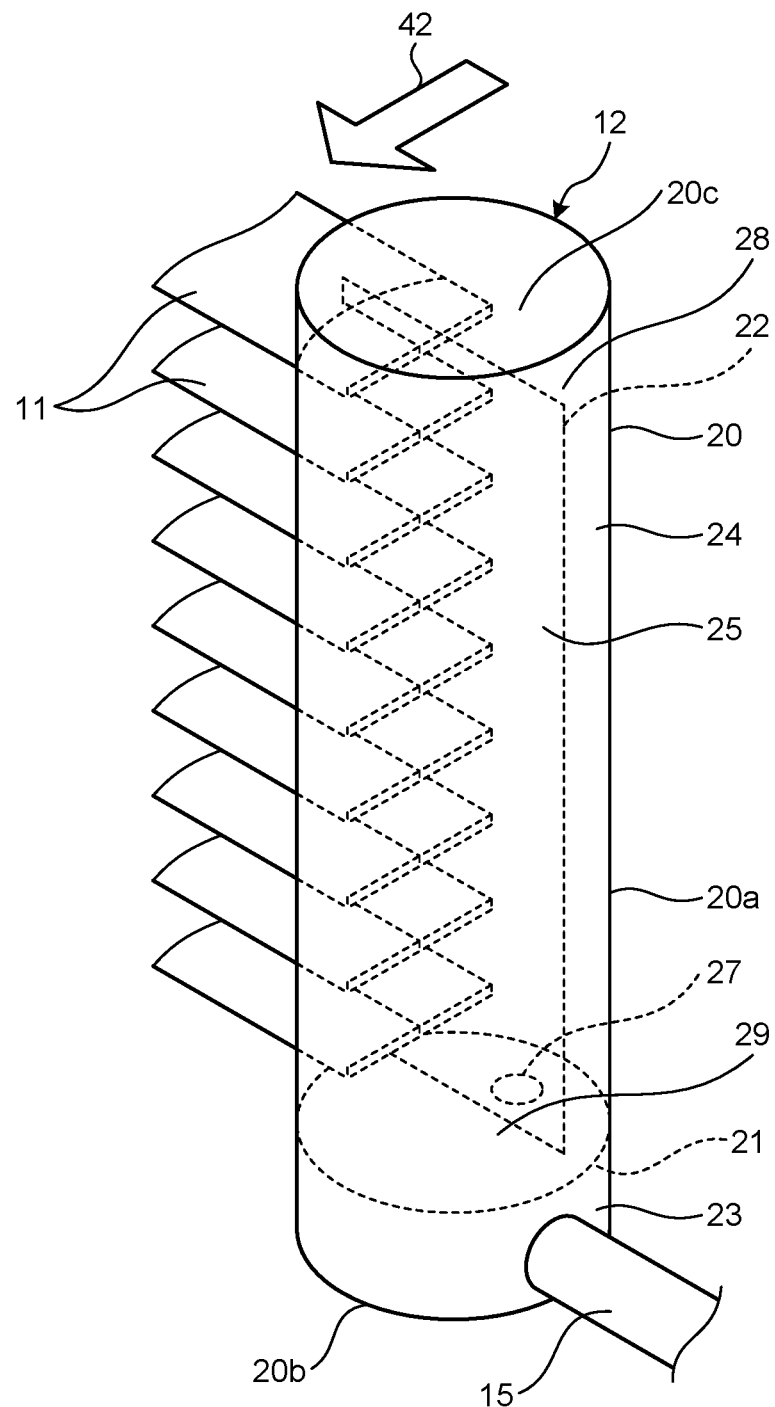
FIG. 4 is a perspective view of a header of the heat exchanger according to the first embodiment of the present invention.
Figure 5:
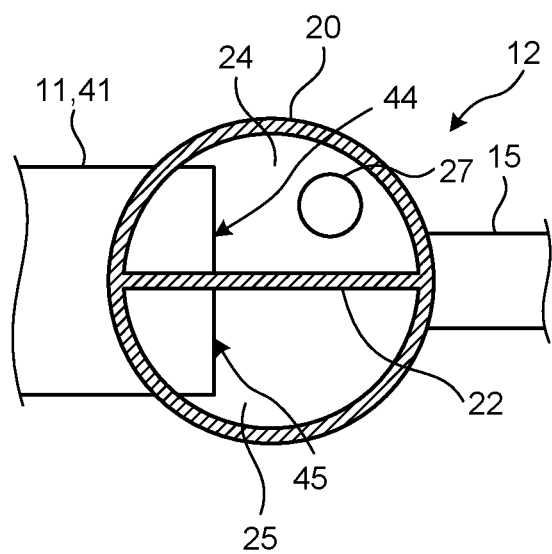
FIG. 5 is a horizontal cross-sectional view of the header illustrated in FIG. 4.
Figure 6:
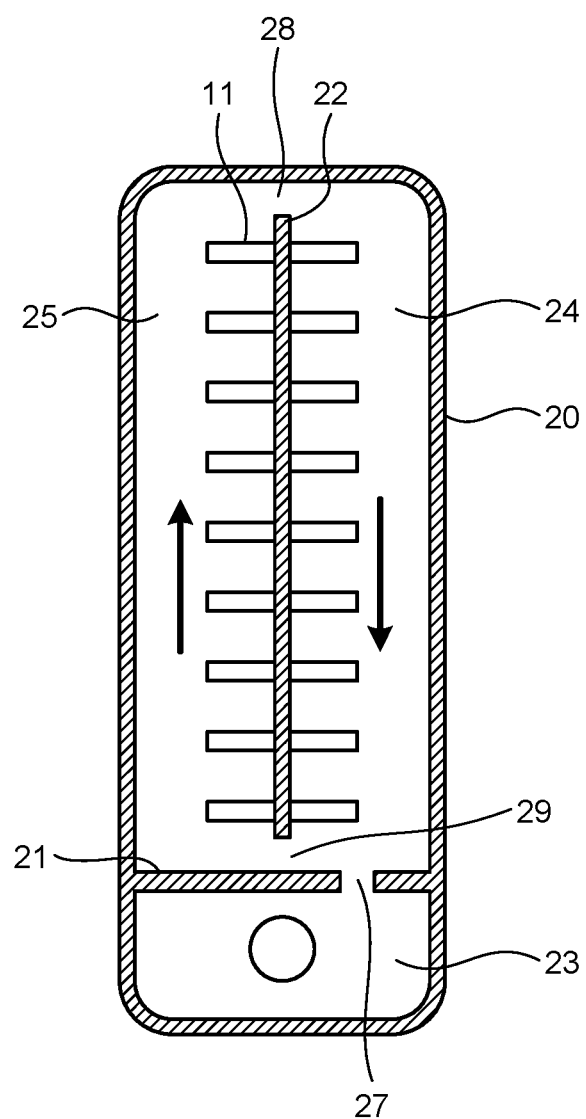
FIG. 6 is a vertical cross-sectional view of the header illustrated in FIG. 4.

In the following, the header 12 according to the first embodiment of the present invention will be described with reference to FIG. 4 to FIG. 6. FIG. 4 is a perspective view of the header 12 included in the heat exchanger according to the first embodiment of the present invention. FIG. 5 is a horizontal cross-sectional view of the header 12. FIG. 6 is a vertical cross-sectional view of the header 12. Furthermore, in the present application, the plurality of flat heat transfer tubes 11 side of the header 12 is referred to as an inner side, whereas the side that is an opposite side of the plurality of flat heat transfer tubes 11 connected to the header 12 is referred to as an outer side. Furthermore, an upstream side of external air is referred to as an upwind side, whereas a downstream side of external air is referred to as a downwind side. In FIG. 4, an illustration of the fins 14 is omitted.

The header 12 includes a main body portion 20 that has a tubular shape, a first partition member 21 that is provided in the interior of the main body portion 20, and a second partition member 22 that is provided in the interior of the main body portion 20. The main body portion 20 includes a cylindrical portion 20a that extends in the vertical direction and that has a cylindrical shape, a lower wall 20b that blocks a lower end opening of the cylindrical portion 20a, and an upper wall 20c that blocks an upper end opening of the cylindrical portion 20a. In other words, the main body portion 20 is formed in a hollow shape. As illustrated in FIG. 3 and FIG. 4, the header 12 having a cylindrical shape is used; however, the shape is not limited to the cylindrical shape, the header 12 having the interior portion with a rectangular columnar shape or the like may be used. Furthermore, the header 12 includes, as illustrated in FIG. 4 and FIG. 5, the first partition member 21 that divides the main body portion 20 having the tubular shape into two spaces that are aligned in the vertical direction and the second partition member 22 that divides the upper part side of the main body portion 20 divided by the first partition member 21 into two spaces that are aligned in the flow direction of external air. The first partition member 21 is provided in the entire cross section in the horizontal direction of the main body portion 20, whereas the second partition member 22 is provided on the upper part of the first partition member 21 included in the main body portion 20 in the entire cross section in the vertical direction of the main body portion 20.

The space that is located on the lower part side of the main body portion 20 and that is divided by the first partition member 21 is a refrigerant flow outlet/inlet space 23 in which the low-temperature low-pressure gas-liquid two-phase refrigerant flows in from the expansion valve 7 via the pipe 15. Furthermore, on the upper part side of the main body portion 20 divided by the second partition member 22 and the first partition member 21, the space on the upwind side of the external air is an upwind side space 24, whereas the space on the downwind side is a downwind side space 25.

An upwind side flow inlet/outlet port 27 is provided on the upwind side of the first partition member 21, that is, on the first partition member 21 corresponding to the bottom surface of the upwind side space 24. At the upper part of the second partition member 22, an upper communication path 28 that communicates the upwind side space 24 and the downwind side space 25 is formed as a result of the upper end of the second partition member 22 being away from the upper wall 20c. In the vicinity of the lower part of the second partition member 22, a lower communication path 29 that communicates the upwind side space 24 and the downwind side space 25 is formed as a result of the lower end of the second partition member 22 being away from the first partition member 21.

The plurality of flat heat transfer tubes 11 is bonded to the header 12 such that one end of each of the flat heat transfer tubes 11 is disposed in the interior portion of the main body portion 20. Specifically, the flat heat transfer tube 41 is bonded to the header 12 by being disposed such that the ends of the plurality of upwind side channels 44 are disposed in the upwind side space 24 and the ends of the plurality of downwind side channels 45 are disposed in the downwind side space 25. Similarly to the flat heat transfer tube 41, the other flat heat transfer tubes that are different from the flat heat transfer tube 41 included in the plurality of flat heat transfer tubes 11 are also bonded to the header 12 such that the ends of the plurality of upwind side channels 44 are disposed in the upwind side space 24 and the ends of the plurality of downwind side channels 45 are disposed in the downwind side space 25. Furthermore, the second partition member 22 is formed such that notches are formed and aligned in the vertical direction so as not to interfere with one end of the flat heat transfer tube 41.

At the Time of Heating Operation

In the heat exchanger 5, at the time of a heating operation performed by the air conditioner 1, a gas-liquid two-phase refrigerant is supplied to the refrigerant flow outlet/inlet space 23 from the expansion valve 7 via the pipe 15. The gas-liquid two-phase refrigerant supplied to the refrigerant flow outlet/inlet space 23 is supplied to the lower part of the upwind side space 24 via the upwind side flow inlet/outlet port 27 of the first partition member 21. The gas-liquid two-phase refrigerant supplied to the lower part of the upwind side space 24 ascends the upwind side space 24. The gas-liquid two-phase refrigerant ascended the upwind side space 24 is supplied to the upper part of the downwind side space 25 via the upper communication path 28 of the second partition member 22. The gas-liquid two-phase refrigerant supplied to the upper part of the downwind side space 25 descends the downwind side space 25. The gas-liquid two-phase refrigerant descended the downwind side space 25 is supplied to the lower part of the upwind side space 24 via the lower communication path 29 of the second partition member 22. The gas-liquid two-phase refrigerant supplied to the upwind side space 24 via the lower communication path 29 is pushed up by the gas-liquid two-phase refrigerant that ascends the upwind side space 24 and ascends the upwind side space 24 together with the gas-liquid two-phase refrigerant that ascends the upwind side space 24.

The gas-liquid two-phase refrigerant that is present in the upwind side space 24 flows into the plurality of upwind side channels 44 formed in the plurality of flat heat transfer tubes 11 and flows through the plurality of upwind side channels 44. The gas-liquid two-phase refrigerant that is present in the downwind side space 25 flows into the plurality of downwind side channels 45 formed in the plurality of flat heat transfer tubes 11 and flows through the plurality of downwind side channels 45. The gas-liquid two-phase refrigerants flowing through the plurality of upwind side channels 44 and the plurality of downwind side channels 45 are heated by being subjected to heat exchange with the external air located in the plurality of flat heat transfer tubes 11, and changes its state into a gas refrigerant as a result of the liquid refrigerant out of the gas-liquid two-phase refrigerant being vaporized and the degree of dryness being increased. The gas refrigerant flowing through the plurality of upwind side channels 44 and the plurality of downwind side channels 45 is supplied to the interior portion of the header 13, is supplied to the four-way valve 8 via the pipe 16, and is then supplied to the compressor 6. In this way, the heat exchanger 5 is able to appropriately function as an evaporator at the time of a heating operation of the air conditioner 1.

The liquid refrigerant out of the gas-liquid two-phase refrigerant present in the upwind side space 24 is less likely to be pushed up by the gas-liquid two-phase refrigerant that ascends the upwind side space 24 when the flow rate of the refrigerant supplied to the upwind side space 24 via the upwind side flow inlet/outlet port 27 is low as compared to the case where the flow rate of the refrigerant is high, and the liquid refrigerant tends to be retained in the lower part of the upwind side space 24. As a result, the ratio of the liquid refrigerant to the gas-liquid two-phase refrigerant supplied from the upwind side space 24 to the downwind side space 25 via the upper communication path 28 tends to be lower than the ratio of the liquid refrigerant to the gas-liquid two-phase refrigerant that is present in the upwind side space 24. As a result, the ratio of the liquid refrigerant to the gas-liquid two-phase refrigerant that is present in the upwind side space 24 is higher than the ratio of the liquid refrigerant to the gas-liquid two-phase refrigerant that is present in the downwind side space 25. The mass flow rate of the gas-liquid two-phase refrigerant flowing into the plurality of upwind side channels 44 formed in the plurality of flat heat transfer tubes 11 is higher than the mass flow rate of the gas-liquid two-phase refrigerant flowing into the plurality of downwind side channels 45 because the ratio of the liquid refrigerant to the gas-liquid two-phase refrigerant in the upwind side space 24 is higher than the ratio of the liquid refrigerant to the gas-liquid two-phase refrigerant in the downwind side space 25.

The air that is subjected to heat exchange with the refrigerant flowing through the plurality of downwind side channels 45 is the air that has been subjected to heat exchange with the refrigerant flowing through the plurality of upwind side channels 44. For that reason, the temperature difference between the air and the refrigerant flowing through the plurality of upwind side channels 44 is larger than the temperature difference between the air and the refrigerant flowing through the plurality of downwind side channels 45. For that reason, an amount of heat transferred from the air to the gas-liquid two-phase refrigerant flowing through the plurality of upwind side channels 44 is greater than an amount of heat transferred from the air to the gas-liquid two-phase refrigerant flowing through the plurality of downwind side channels 45. In other words, a relatively large amount of heat is transferred to a relatively large amount of gas-liquid two-phase refrigerant flowing through the plurality of upwind side channels 44, and a relatively small amount of heat is transferred to a relatively small amount of the gas-liquid two-phase refrigerant flowing through the plurality of downwind side channels 45. As a result, the heat exchanger 5 is able to make the degree of dryness of the refrigerant that has passed through the plurality of upwind side channels 44 and the plurality of downwind side channels 45 formed in the plurality of flat heat transfer tubes 11 uniform. As a result, when the heat exchanger 5 is used as an evaporator, it is possible to allow the degree of dryness of the refrigerant passing through the heat exchanger 5 to be about 1.0, which is an ideal state.

In the other heat exchanger in which a refrigerant equally flowing through the plurality of channels 43, after the entire liquid refrigerant out of the gas-liquid two-phase refrigerant flowing through the plurality of upwind side channels 44 has been evaporated, the gas refrigerant is sometimes overheated caused by heat being transferred from air to the evaporated gas refrigerant and, in contrast, in some cases, the liquid refrigerant out of the gas-liquid two-phase refrigerant flowing through the plurality of downwind side channels 45 is not fully vaporized due to insufficient heat exchange with air. In this case, heat exchange between the air and the refrigerant is not efficiently performed. In contrast, the heat exchanger 5 is able to prevent the gas refrigerant from being overheated by making the degree of dryness the refrigerant that has passed through the plurality of upwind side channels 44 and the plurality of downwind side channels 45 formed in the plurality of flat heat transfer tubes 11 uniform, and, as a result, when the heat exchanger 5 is used as an evaporator, it is possible to allow the degree of dryness of the refrigerant passing through the heat exchanger 5 to be about 1.0, which is an ideal state.

At the Time of Cooling Operation

In the heat exchanger 5, at the time of a cooling operation performed by the air conditioner 1, the gas refrigerant compressed by the compressor 6 is supplied from the four-way valve 8 to the header 13 via the pipe 16. The gas refrigerant supplied to the header 13 is branched off and flows into the plurality of channels 43 formed in the plurality of flat heat transfer tubes 11. The gas refrigerant flowing through the plurality of channels 43 is liquefied by being subjected to heat exchange with the air that flows through an outer part of the plurality of flat heat transfer tubes 11, and changes its state into a liquid refrigerant. The liquid refrigerant flowing through the plurality of channels 43 is supplied to the upwind side space 24 and the downwind side space 25 in the header 12. The liquid refrigerant supplied to the downwind side space 25 descends the downwind side space 25 and is retained in the lower part of the downwind side space 25. The liquid refrigerant retained in the lower part of the downwind side space 25 is supplied to the lower part of the upwind side space 24 via the lower communication path 29 and is retained in the lower part of the upwind side space 24. The liquid refrigerant supplied to the upwind side space 24 descends the upwind side space 24 and is retained in the lower part of the upwind side space 24. The liquid refrigerant retained in the lower part of the upwind side space 24 is supplied to the refrigerant flow outlet/inlet space 23 via the upwind side flow inlet/outlet port 27. The liquid refrigerant supplied to the refrigerant flow outlet/inlet space 23 is supplied to the expansion valve 7 via the pipe 15. In this way, the heat exchanger 5 is able to appropriately function as a condenser at the time of a cooling operation performed by the air conditioner 1.

The liquid refrigerant that is present in the upwind side space 24 is discharged to the refrigerant flow outlet/inlet space 23 as a result of flowing through the upwind side flow inlet/outlet port 27, whereas the liquid refrigerant that is present in the downwind side space 25 needs to pass the lower communication path 29 and the upwind side flow inlet/outlet port 27 when the liquid refrigerant is discharged to the refrigerant flow outlet/inlet space 23. Consequently, the channel resistance of the refrigerant discharged from the downwind side space 25 to the refrigerant flow outlet/inlet space 23 is larger than the channel resistance of the refrigerant discharged from the upwind side space 24 to the refrigerant flow outlet/inlet space 23, and the flow rate of the refrigerant discharged from the upwind side space 24 is higher than the flow rate of the refrigerant discharged from the downwind side space 25. As a result, the flow rate of the refrigerant flowing through the plurality of upwind side channels 44 formed in the plurality of flat heat transfer tubes 11 is higher than the flow rate of the refrigerant flowing through the plurality of downwind side channels 45. Accordingly, the heat exchanger 5 is able to make an amount of heat transferred per unit related to the gas-liquid two-phase refrigerant flowing through the plurality of channels 43 formed in the plurality of flat heat transfer tubes 11 equal. In other words, by making the amount of heat transferred per unit related to the refrigerant flowing through the plurality of channels 43 equal, the heat exchanger 5 is able to prevent the refrigerant flowing through the plurality of upwind side channels 44 from being overcooled and improve the performance of heat exchange between air and the refrigerant.

Second Embodiment

Figure 7:
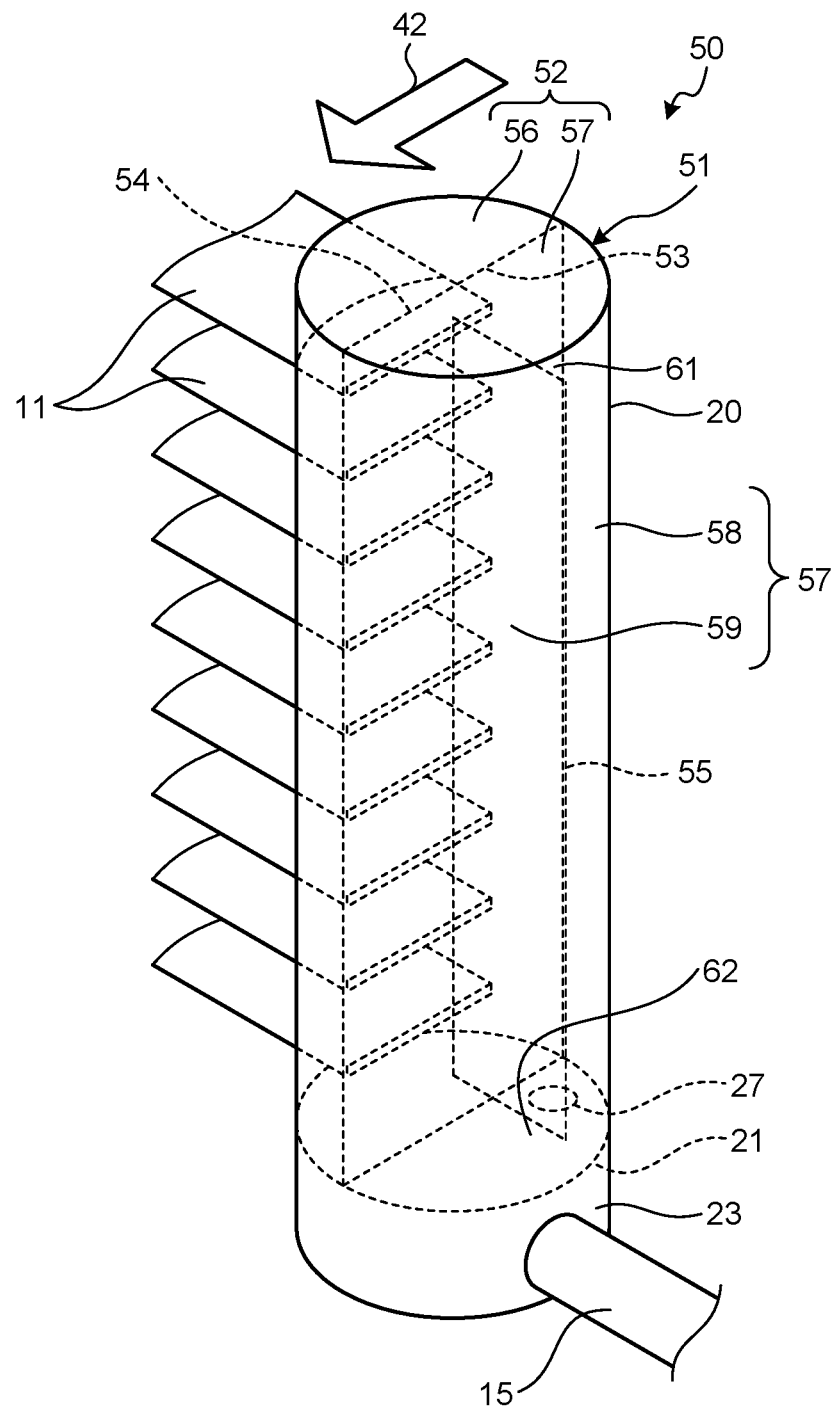
FIG. 7 is a perspective view illustrating a header of a heat exchanger according to a second embodiment of the present invention.

A header 51 used in a heat exchanger 50 according to a second embodiment has a configuration, as illustrated in FIG. 7, in which the second partition member 22 included in the header 12 in the heat exchanger 5 according to the first embodiment described above is replaced with other plurality of partition members, and the other parts are the same as those used in the header 12 described above. FIG. 7 is a perspective view illustrating the header 51 included in the heat exchanger according to the second embodiment of the present invention.

In other words, the header 51 includes, similarly to the header 12 described above, the main body portion 20 and the first partition member 21. The main body portion 20 is formed in a tubular shape, and an interior portion space is formed in the interior portion of the main body portion 20. The first partition member 21 is formed in a circular plate shape. The first partition member 21 is disposed in the interior portion space of the main body portion 20 such that the interior portion space of the main body portion 20 is divided into the refrigerant flow outlet/inlet space 23 and an upper part space 52 and is bonded to the main body portion 20. The refrigerant flow outlet/inlet space 23 is formed at a position closer to the lower side than the first partition member 21 included in the interior portion space of the main body portion 20. The upper part space 52 is formed at a position closer to the upper side than the first partition member 21 included in the interior portion space of the main body portion 20.

The header 51 further includes an upwind side partition member 53, a downwind side partition member 54, and a circulation space partition member 55. Each of the upwind side partition member 53 and the downwind side partition member 54 is formed of a single flat place. Each of the upwind side partition member 53 and the downwind side partition member 54 is disposed in the interior portion space of the main body portion 20 such that the upper part space 52 is divided into a heat transfer tube insertion space 56 that is a space to which one ends of the plurality of flat heat transfer tubes 11 are connected and a circulation space 57 that is a space to which the one ends of the plurality of flat heat transfer tubes 11 are not connected and is then bonded to the main body portion 20 and the first partition member 21. The heat transfer tube insertion space 56 is formed on the side closer to the plurality of flat heat transfer tubes 11 than the upwind side partition member 53 and the downwind side partition member 54 that are formed in the upper part space 52. The circulation space 57 is formed on the side farther away from the plurality of flat heat transfer tubes 11 than the upwind side partition member 53 and the downwind side partition member 54 that are formed in the upper part space 52.

The circulation space partition member 55 is formed in a flat plate shape. The circulation space partition member 55 is disposed in the interior portion space of the main body portion 20 such that the circulation space 57 is divided into a upwind side space 58 and a downwind side space 59 and is bonded to the main body portion 20, the upwind side partition member 53, and the downwind side partition member 54.

In the first partition member 21, the upwind side flow inlet/outlet port 27 that communicates the refrigerant flow outlet/inlet space 23 and the upwind side space 58 is formed. At the upper part of the circulation space partition member 55, an upper communication path 61 that communicates the upwind side space 58 and the downwind side space 59 is formed as a result of the upper end of the circulation space partition member 55 being away from the upper wall 20c. In the vicinity of the lower part of the circulation space partition member 55, a lower communication path 62 that communicates the upwind side space 58 and the downwind side space 59 is formed as a result of the lower end of the circulation space partition member 55 being away from the first partition member 21.

Figure 8:
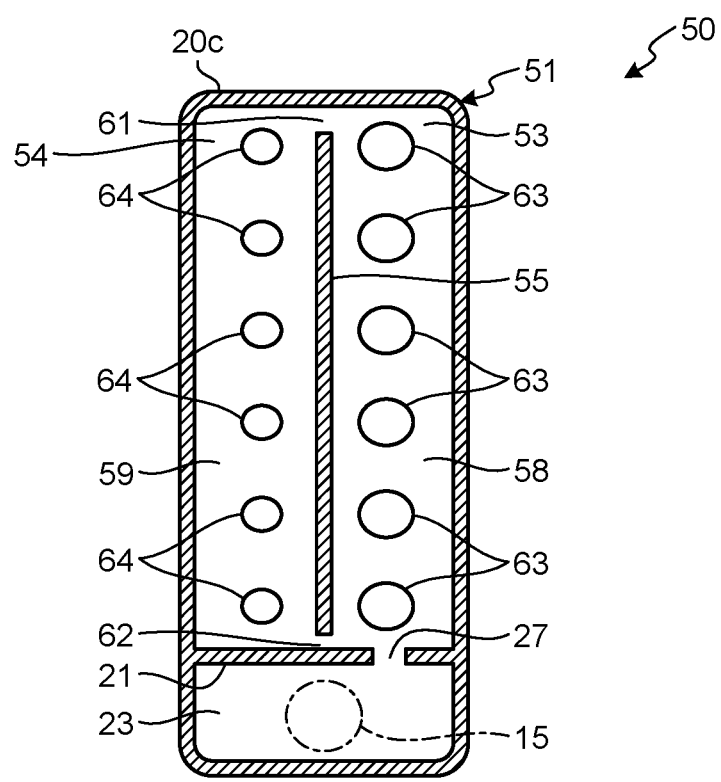
FIG. 8 is a vertical cross-sectional view of the header illustrated in FIG. 7.

FIG. 8 is a cross-sectional view of the header 51 in the vertical direction (up/down direction) illustrated in FIG. 7. In the upwind side partition member 53, a plurality of upwind side communication holes 63 that communicate the upwind side space 58 and the heat transfer tube insertion space 56 are formed. In the downwind side partition member 54, a plurality of downwind side communication holes 64 that communicate the downwind side space 59 and the heat transfer tube insertion space 56 are formed. At this time, the sum total of the opening area of the plurality of upwind side communication holes 63 is larger than the sum total of the opening area of the plurality of downwind side communication holes 64. As a result, the mass flow rate of the gas-liquid two-phase refrigerant flowing into the plurality of upwind side channels 44 is higher than the mass flow rate of the gas-liquid two-phase refrigerant flowing into the plurality of downwind side channels 45.

Figure 9:
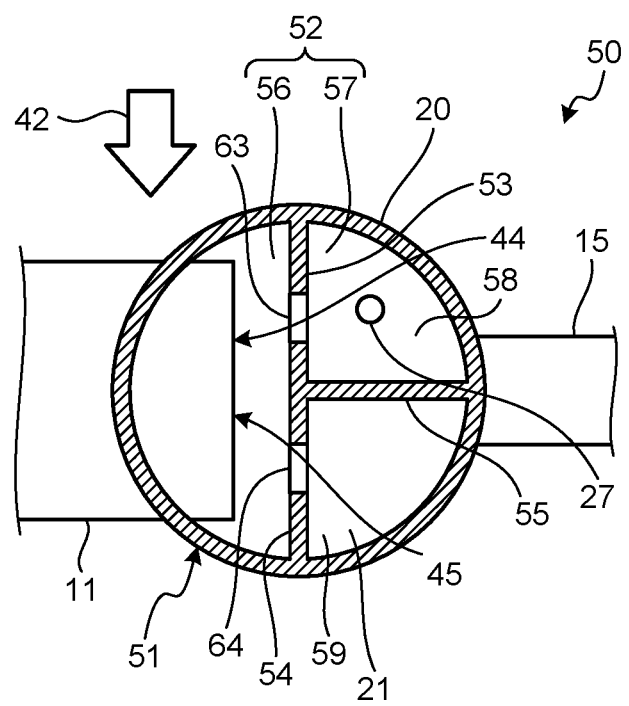
FIG. 9 is a horizontal cross-sectional view of the header illustrated in FIG. 7.

FIG. 9 is a cross-sectional view of the header 51 illustrated in FIG. 7 in the direction (horizontal direction) perpendicular to the vertical direction. The upwind side space 58 is formed in an area that is located closer to the end portion of the plurality of upwind side channels 44 formed in the circulation space 57. The downwind side space 59 is formed in an area that is located closer to the end portion of the plurality of downwind side channels 45 formed in the circulation space 57. At this time, the upwind side partition member 53 is disposed between the heat transfer tube insertion space 56 and the upwind side space 58 and divides the heat transfer tube insertion space 56 and the upwind side space 58. The downwind side partition member 54 is disposed between the heat transfer tube insertion space 56 and the downwind side space 59 and divides the heat transfer tube insertion space 56 and the downwind side space 59.

At the Time of Heating Operation

The heat exchanger according to the second embodiment is operated in substantially the same manner as the heat exchanger 5 according to the first embodiment described above. In other words, in the heat exchanger 50, at the time of a heating operation performed by the air conditioner 1, a gas-liquid two-phase refrigerant is supplied from the expansion valve 7 to the refrigerant flow outlet/inlet space 23 via the pipe 15. The gas-liquid two-phase refrigerant supplied to the refrigerant flow outlet/inlet space 23 is supplied to the lower part of the upwind side space 58 via the upwind side flow inlet/outlet port 27 formed in the first partition member 21. The gas-liquid two-phase refrigerant supplied to the lower part of the upwind side space 58 ascends the upwind side space 58. The gas-liquid two-phase refrigerant that ascends the upwind side space 58 is supplied to the upper part of the downwind side space 59 via the upper communication path 61 of the circulation space partition member 55. The gas-liquid two-phase refrigerant supplied to the upper part of the downwind side space 59 descends the downwind side space 59. The gas-liquid two-phase refrigerant that has descended the downwind side space 59 is supplied to the lower part of the upwind side space 58 via the lower communication path 62 of the circulation space partition member 55. The gas-liquid two-phase refrigerant supplied to the upwind side space 58 via the lower communication path 62 is pushed up by the gas-liquid two-phase refrigerant that ascends the upwind side space 58 and ascends the upwind side space 48 together with the gas-liquid two-phase refrigerant that ascends the upwind side space 58.

The gas-liquid two-phase refrigerant present in the upwind side space 58 is supplied to the area located in the vicinity of the end of the plurality of upwind side channels 44 formed in the heat transfer tube insertion space 56 via the plurality of upwind side communication holes 63 formed in the upwind side partition member 53. The gas-liquid two-phase refrigerant present in the area located in the vicinity of the end of the plurality of upwind side channels 44 formed in the heat transfer tube insertion space 56 flows into the plurality of upwind side channels 44 formed in the plurality of flat heat transfer tubes 11 and flows through the plurality of upwind side channels 44. The gas-liquid two-phase refrigerant present in the downwind side space 59 is supplied to the area located in the vicinity of the plurality of downwind side channels 45 formed in the heat transfer tube insertion space 56 via the plurality of downwind side communication holes 64 formed in the downwind side partition member 54. The gas-liquid two-phase refrigerant present in the area located in the vicinity of the end of the plurality of downwind side channels 45 formed in the heat transfer tube insertion space 56 flows into the plurality of downwind side channels 45 formed in the plurality of flat heat transfer tubes 11 and flows through the plurality of downwind side channels 45. The gas-liquid two-phase refrigerant that flows through the plurality of upwind side channels 44 and the plurality of downwind side channels 45 is heated as a result of being subjected to heat exchange with external air in the plurality of flat heat transfer tubes 11, and changes its state into a gas refrigerant as a result of the liquid refrigerant out of the gas-liquid two-phase refrigerant being vaporized. The gas refrigerant flowing through the plurality of upwind side channels 44 and the plurality of downwind side channels 45 is supplied to the interior portion of the header 13, is supplied to the four-way valve 8 via the pipe 16, and is then supplied to the compressor 6. In this way, the heat exchanger 50 is able to appropriately function as an evaporator at the time of a heating operation performed by the air conditioner 1.

The ratio of the liquid refrigerant to the gas-liquid two-phase refrigerant present in the upwind side space 58 is higher than the ratio of the liquid refrigerant to the gas-liquid two-phase refrigerant present in the upwind side space 58 when the flow rate of the refrigerant supplied to the downwind side space 59 via the upwind side flow inlet/outlet port 27, similarly to the case of the heat exchanger 5 according to the first embodiment described above. As a result, the ratio of the liquid refrigerant to the gas-liquid two-phase refrigerant present in the area located in the vicinity of the end of the plurality of upwind side channels 44 included in the heat transfer tube insertion space 56 is also higher than the ratio of the liquid refrigerant to the gas-liquid two-phase refrigerant present in the area located in the vicinity of the end of the plurality of downwind side channels 45 formed in the heat transfer tube insertion space 56. As a result, the mass flow rate of the gas-liquid two-phase refrigerant flowing into the plurality of upwind side channels 44 is higher than the mass flow rate of the gas-liquid two-phase refrigerant flowing into the plurality of downwind side channels 45 because the ratio of the liquid refrigerant to the gas-liquid two-phase refrigerant present in the upwind side space 58 is higher than the ratio of the liquid refrigerant to the gas-liquid two-phase refrigerant present in the downwind side space 59. As a result, similarly to the heat exchanger 5 50 described above, the heat exchanger 50 is able to make the degree of dryness of the refrigerant that has passed through the plurality of upwind side channels 44 and the plurality of downwind side channels 45 formed in the plurality of flat heat transfer tubes 11 uniform. As a result, when the heat exchanger 5 is used as an evaporator, it is possible to allow the degree of dryness of the refrigerant passing through the heat exchanger 5 50 to be about 1.0, which is an ideal state.

In the other heat exchanger in which a refrigerant equally flowing through the plurality of channels 43, after the entire liquid refrigerant out of the gas-liquid two-phase refrigerant flowing through the plurality of upwind side channels 44 has been evaporated, the gas refrigerant obtained by being evaporated is sometimes overheated caused by heat being transferred from air to the evaporated gas refrigerant and, at this time, the performance of heat exchange is degraded. The heat exchanger 50 prevents the gas refrigerant from being overheated by making the degree of dryness of the refrigerant that has passed through the plurality of upwind side channels 44 and the plurality of downwind side channels 45 formed in the plurality of flat heat transfer tubes 11 uniform, and, as a result, when the heat exchanger 50 is used as an evaporator, it is possible to allow the degree of dryness of the refrigerant passing through the heat exchanger 50 to be about 1.0, which is an ideal state.

At the Time of Cooling Operation

In the heat exchanger 50, at the time of a cooling operation performed by the air conditioner 1, the gas refrigerant compressed by the compressor 6 is supplied from the four-way valve 8 to the header 13 via the pipe 16. The gas refrigerant supplied to the header 13 is branched off and flows into the plurality of channels 43 formed in the plurality of flat heat transfer tubes 11. The gas refrigerant flowing through the plurality of channels 43 is liquefied by being subjected to heat exchange with the air flowing through an outer part of the plurality of flat heat transfer tubes 11, and changes its state into a liquid refrigerant. The liquid refrigerant flowing through the plurality of channels 43 is supplied to the heat transfer tube insertion space 56 in the header 51. The liquid refrigerant supplied to the heat transfer tube insertion space 56 is supplied to the upwind side space 58 via the plurality of upwind side communication holes 63 and is supplied to the downwind side space 59 via the plurality of downwind side communication holes 64. The liquid refrigerant supplied to the upwind side space 58 descends the upwind side space 58 and is retained in the lower part of the upwind side space 58. The liquid refrigerant supplied to the downwind side space 59 descends the downwind side space 59 and is retained in the lower part of the downwind side space 59. The liquid refrigerant retained in the lower part of the downwind side space 59 is supplied to the lower part of the upwind side space 58 via the lower communication path 62 and is retained in the lower part of the upwind side space 58. The liquid refrigerant retained in the lower part of the upwind side space 58 is supplied to the refrigerant flow outlet/inlet space 23 via the upwind side flow inlet/outlet port 27. The liquid refrigerant supplied to the refrigerant flow outlet/inlet space 23 is supplied to the expansion valve 7 via the pipe 15. In this way, the heat exchanger 50 is able to appropriately function as a condenser at the time of a cooling operation performed by the air conditioner 1.

The flow rate of the refrigerant discharged from the upwind side space 58 to the refrigerant flow outlet/inlet space 23 is higher than the flow rate of the refrigerant discharged from the downwind side space 59 to the refrigerant flow outlet/inlet space 23, similarly to the upwind side space 24 in the heat exchanger 5 according to the first embodiment. Accordingly, the flow rate of the refrigerant discharged from the area located in the vicinity of the end of the plurality of upwind side channels 44 included in the heat transfer tube insertion space 56 to the upwind side space 58 is higher than the flow rate of the refrigerant discharged from the area located in the vicinity of the end of the plurality of downwind side channels 45 included in the heat transfer tube insertion space 56 to the downwind side space 59. As a result, the flow rate of the refrigerant supplied from the plurality of upwind side channels 44 to the heat transfer tube insertion space 56 is higher than the flow rate of the refrigerant supplied from the plurality of downwind side channels 45 to the heat transfer tube insertion space 56, and the flow rate of the refrigerant flowing through the plurality of upwind side channels 44 is higher than the flow rate of the refrigerant flowing through the plurality of downwind side channels 45. Consequently, the heat exchanger 50 is able to make an amount of heat transferred per unit related to the liquid refrigerant flowing through the plurality of channels 43 included in the plurality of flat heat transfer tubes 11 equal. In other words, the heat exchanger 50 is able to prevent the refrigerant flowing through the plurality of upwind side channels 44 from being overcooled and improve the performance of heat exchange between air and the refrigerant even if the heat exchanger 50 is used as a condenser.

Third Embodiment

Figure 10:
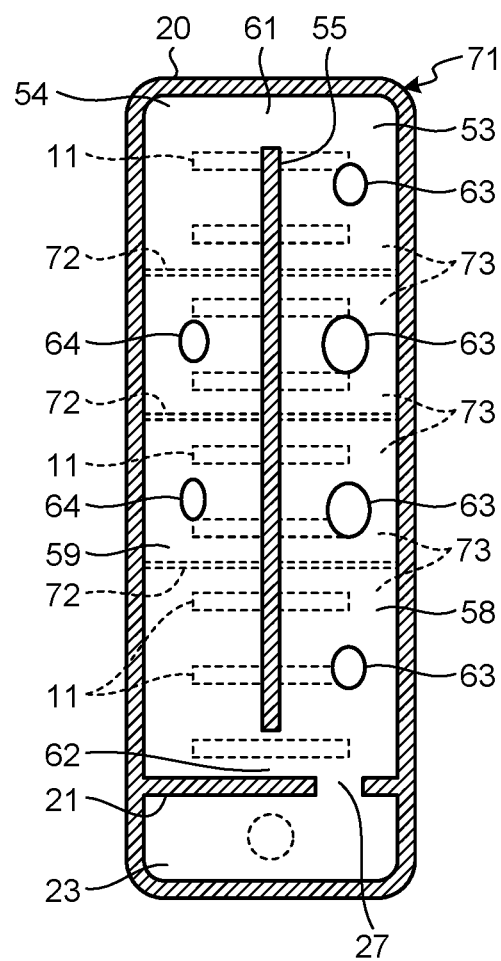
FIG. 10 is a vertical cross-sectional view illustrating a header of a heat exchanger according to a third embodiment of the present invention.

A header 71 used in a heat exchanger according to a third embodiment has a configuration, as illustrated in FIG. 10, in which a plurality of partition members 72 are added to the header 51 included in the heat exchanger 50 according to the second embodiment described above. FIG. 10 is a cross-sectional view of the header 71 in the vertical direction (up/down direction) included in the heat exchanger according to the third embodiment of the present invention. Each of the plurality of partition members 72 is formed of a substantially semi-circular shaped plate. The plurality of partition members 72 is disposed in the heat transfer tube insertion space 56 such that the heat transfer tube insertion space 56 is divided into a plurality of heat transfer tube insertion spaces 73 and is bonded to the main body portion 20, the upwind side partition member 53, and the downwind side partition member 54. The plurality of partition members 72 are disposed such that one of the end portions of the plurality of flat heat transfer tubes 11 is disposed in each of the plurality of heat transfer tube insertion spaces 73. The plurality of partition members 72 is further disposed such that each of the plurality of heat transfer tube insertion spaces 73 communicates the upwind side space 58 by way of one of the plurality of upwind side communication holes 63.

At the Time of Heating Operation

The heat exchanger according to the third embodiment is operated in substantially the same manner as the heat exchanger 50 according to the second embodiment described above. In other words, in the heat exchanger according to the third embodiment, at the time of a heating operation performed by the air conditioner 1, the gas-liquid two-phase refrigerant is supplied from the expansion valve 7 to the refrigerant flow outlet/inlet space 23 via the pipe 15. The gas-liquid two-phase refrigerant supplied to the refrigerant flow outlet/inlet space 23 circulates the circulation space 57 by ascending the upwind side space 58 and descending the downwind side space 59. At this time, the ratio of the liquid refrigerant to the gas-liquid two-phase refrigerant present in the upwind side space 58 is higher than the ratio of the liquid refrigerant of the gas-liquid two-phase refrigerant present in the downwind side space 59 when the flow rate of the refrigerant supplied to the upwind side space 58 via the upwind side flow inlet/outlet port 27 is relatively low.

The gas-liquid two-phase refrigerant present in the upwind side space 58 is supplied to the area located in the vicinity of the end of the plurality of upwind side channels 44 out of the plurality of heat transfer tube insertion spaces 73 via the plurality of upwind side communication holes 63 included in the upwind side partition member 53. The gas-liquid two-phase refrigerant present in the area located in the vicinity of the end of the plurality of upwind side channels 44 included in the plurality of heat transfer tube insertion spaces 73 flows into the plurality of upwind side channels 44 included in the plurality of flat heat transfer tubes 11 and flows through the plurality of upwind side channels 44. The gas-liquid two-phase refrigerant present in the downwind side space 59 is supplied to the area located in the vicinity of the end of the plurality of downwind side channels 45 formed in the plurality of heat transfer tube insertion spaces 73 via the plurality of downwind side communication holes 64 included in the downwind side partition member 54. The gas-liquid two-phase refrigerant present in the area located in the vicinity of the end of the plurality of downwind side channels 45 formed in the plurality of heat transfer tube insertion spaces 73 flows into the plurality of downwind side channels 45 formed in the plurality of flat heat transfer tubes 11 and flows through the plurality of downwind side channels 45. The gas-liquid two-phase refrigerant flowing through the plurality of upwind side channels 44 and the plurality of downwind side channels 45 is heated as a result of being subjected to heat exchange with external air present in the plurality of flat heat transfer tubes 11, and changes its state into a gas refrigerant as a result of the liquid refrigerant out of the gas-liquid two-phase refrigerant being vaporized. The gas refrigerant flowing through the plurality of upwind side channels 44 and the plurality of downwind side channels 45 is supplied to the interior portion of the header 13, is supplied to the four-way valve 8 via the pipe 16, and is then supplied to the compressor 6. In this way, the heat exchanger according to the third embodiment is able to appropriately function as an evaporator at the time of a heating operation performed by the air conditioner 1.

In each of the plurality of heat transfer tube insertion spaces 73, the ratio of the liquid refrigerant to the gas-liquid two-phase refrigerant present in the vicinity of the end of the plurality of upwind side channels 44 is higher than the ratio of the liquid refrigerant to the gas-liquid two-phase refrigerant present in the vicinity of the end of the plurality of downwind side channels 45. Consequently, the mass flow rate of the gas-liquid two-phase refrigerant flowing into the plurality of upwind side channels 44 is higher than the mass flow rate of the gas-liquid two-phase refrigerant flowing into the plurality of downwind side channels 45. As a result, similarly to the heat exchanger 50 described above, the heat exchanger according to the third embodiment is able to make the degree of dryness of the refrigerant that has passed through the plurality of upwind side channels 44 and the plurality of downwind side channels 45 formed in the plurality of flat heat transfer tubes 11 uniform. As a result, when the heat exchanger 5 is used as an evaporator, it is possible to allow the degree of dryness of the refrigerant passing through the heat exchanger 5 to be about 1.0, which is an ideal state.

In the heat exchanger 50 described above, the ratio of the liquid refrigerant to the gas-liquid two-phase refrigerant present in the lower part of the heat transfer tube insertion space 56 is sometimes higher than the ratio of the liquid refrigerant to the gas-liquid two-phase refrigerant present in the upper part of the heat transfer tube insertion space 56 caused by gravity. In contrast, the heat exchanger according to the third embodiment is able to equally branch off an amount and a flow of the refrigerant supplied to the plurality of flat heat transfer tubes 11 as compared to the heat exchanger 50 described above because the heat transfer tube insertion space 56 is divided into the plurality of heat transfer tube insertion spaces 73. The heat exchanger according to the third embodiment is able to improve the performance of heat exchange as a result of the amount of the refrigerant supplied to the plurality of flat heat transfer tubes 11 being equal.

At the Time of Cooling Operation

In the heat exchanger according to the third embodiment, at the time of a cooling operation performed by the air conditioner 1, the gas refrigerant compressed by the compressor 6 is supplied from the four-way valve 8 to the header 13 via the pipe 16. The gas refrigerant supplied to the header 13 is substantially equally supplied to the plurality of channels 43 formed in the plurality of flat heat transfer tubes 11. The gas refrigerant flowing through the plurality of channels 43 is liquefied by being subjected to heat exchange with the air flowing through an outer part of the plurality of flat heat transfer tubes 11, and changes its state into a liquid refrigerant. The liquid refrigerant flowing through the plurality of channels 43 is supplied to the plurality of heat transfer tube insertion spaces 73 provided in the header 71. The liquid refrigerant supplied to the plurality of heat transfer tube insertion spaces 73 is supplied to the upwind side space 58 via the plurality of upwind side communication holes 63 and is then supplied to the downwind side space 59 via the plurality of downwind side communication holes 64. The liquid refrigerant supplied to the upwind side space 58 descends the upwind side space 58 and is retained in the lower part of the upwind side space 58. The liquid refrigerant supplied to the downwind side space 59 descends the downwind side space 59 and is retained in the lower part of the downwind side space 59. The liquid refrigerant retained in the lower part of the downwind side space 59 is supplied to the lower part of the upwind side space 58 via the lower communication path 62 and is retained in the lower part of the upwind side space 58. The liquid refrigerant retained in the lower part of the upwind side space 58 is supplied to the refrigerant flow outlet/inlet space 23 via the upwind side flow inlet/outlet port 27. The liquid refrigerant supplied to the refrigerant flow outlet/inlet space 23 is supplied to the expansion valve 7 via the pipe 15. In this way, the heat exchanger according to the third embodiment is able to appropriately function as a condenser at the time of a cooling operation performed by the air conditioner 1.

The flow rate of the refrigerant discharged from the upwind side space 58 to the refrigerant flow outlet/inlet space 23 is higher than the flow rate of the refrigerant discharged from the downwind side space 59 to the refrigerant flow outlet/inlet space 23. Accordingly, the flow rate of a refrigerant discharged from the area located in the vicinity of the end of the plurality of upwind side channels 44 formed in the respective plurality of heat transfer tube insertion spaces 73 to the upwind side space 58 is higher than the flow rate of a refrigerant discharged from the area located in the vicinity of the end of the plurality of downwind side channels 45 in the respective plurality of heat transfer tube insertion spaces 73 to the downwind side space 59. As a result, the flow rate of the refrigerant supplied from the plurality of upwind side channels 44 to the respective plurality of heat transfer tube insertion spaces 73 is higher than the flow rate of the refrigerant supplied from the plurality of downwind side channels 45 to the respective plurality of heat transfer tube insertion spaces 73, and the flow rate of the refrigerant flowing through the plurality of upwind side channels 44 is higher than the flow rate of the refrigerant flowing through the plurality of downwind side channels 45. Consequently, the heat exchanger 50 is able to make an amount of heat transferred per unit related to the liquid refrigerant flowing through the plurality of channels 43 included in the plurality of flat heat transfer tubes 11 equal. In other words, the heat exchanger 50 is able to prevent the refrigerant flowing through the plurality of upwind side channels 44 from being overcooled and improve the performance of heat exchange between air and the refrigerant even if the heat exchanger 50 is used as a condenser.

Incidentally, the sum total of the area of the plurality of upwind side communication holes 63 in the heat exchanger according to the second and the third embodiments described above is larger than the sum total of the area of the plurality of downwind side communication holes 64; however, the sum total of the opening area of the plurality of upwind side communication holes 63 may be the same as the sum total of the opening area of the plurality of downwind side communication holes 64. In this case, the heat exchanger is also able to increase the amount of the refrigerant flowing through the plurality of upwind side channels 44 as compared to the amount of the refrigerant flowing through the plurality of downwind side channels 45, and, when the heat exchanger 5 is used as an evaporator, it is possible to allow the degree of dryness of the refrigerant passing through the heat exchanger 5 to be about 1.0, which is an ideal state. As a result, it is possible to suppress a decrease in the amount of heat exchanged between the air and the refrigerant.

Incidentally, the plurality of downwind side communication holes 64 is formed in the downwind side partition member 54 included in the heat exchanger according to the second and the third embodiments described above; however, the plurality of downwind side communication holes 64 need not always be formed. In the case where the heat exchanger according to the second and the third embodiments described above is used as an evaporator, as a result of the plurality of upwind side channels 44 formed in the plurality of flat heat transfer tubes 11 being located closer to the plurality of upwind side communication holes 63 than the plurality of downwind side channels 45, the mass flow rate of the gas-liquid two-phase refrigerant supplied to the plurality of upwind side channels 44 is higher than the mass flow rate of the gas-liquid two-phase refrigerant supplied to the plurality of downwind side channels 45. In the case where the heat exchanger according to the second and the third embodiments described above is used as a condenser, as a result of the plurality of upwind side channels 44 formed in the plurality of flat heat transfer tubes 11 being located closer to the plurality of upwind side communication holes 63 than the plurality of downwind side channels 45, the amount of the liquid refrigerant discharged from the plurality of upwind side channels 44 is greater than the amount of the liquid refrigerant discharged from the plurality of downwind side channels 45. Consequently, even in such a case, regarding the heat exchanger according to the second and the third embodiments, when the heat exchanger 50 is used as an evaporator, it is possible to allow the degree of dryness of the refrigerant passing through the heat exchanger 50 to be about 1.0, which is an ideal state. As a result, it is possible to suppress a decrease in the amount of heat exchanged between the air and the refrigerant.

Figure 11:
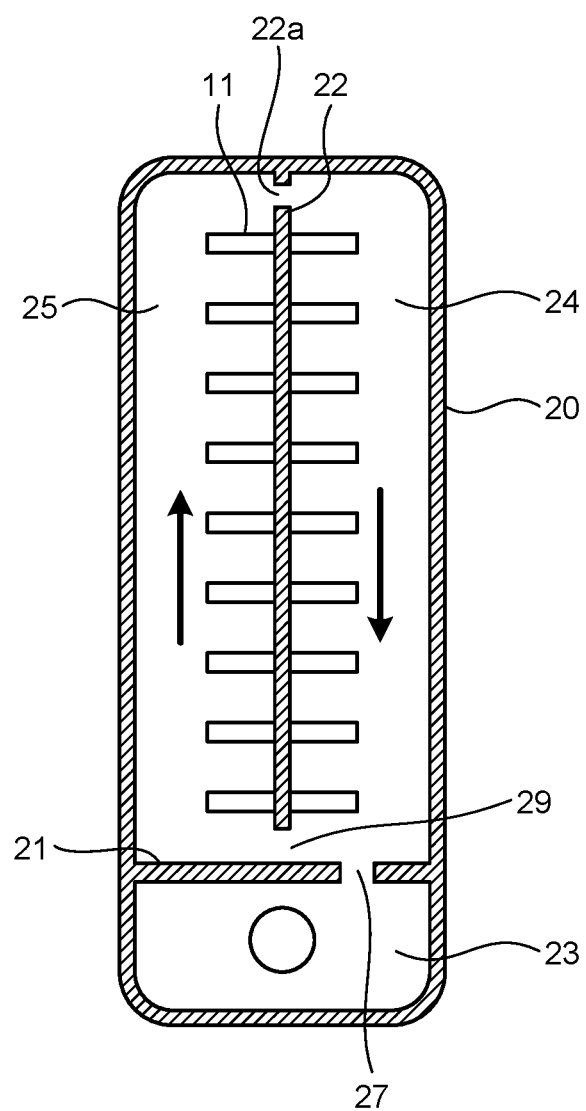
FIG. 11 is a vertical cross-sectional view illustrating a modification of the header.
Figure 12:
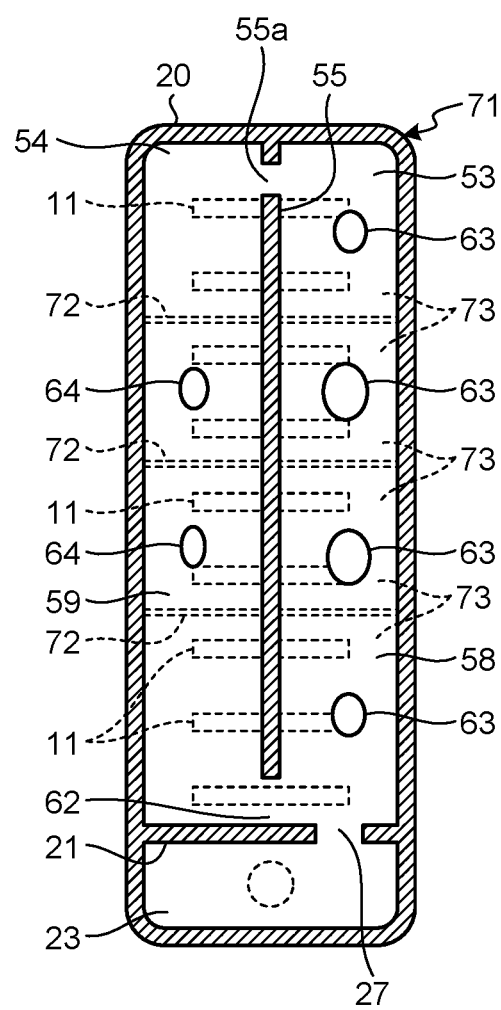
FIG. 12 is a vertical cross-sectional view illustrating another modification of the header.

Incidentally, the upper communication path 28 is formed as a result of the upper end of the second partition member 22 being disposed away from the member that forms the upper end of the interior portion space formed in the main body portion 20; however, as illustrated in FIG. 11, the upper communication path 28 may be formed as a result of an upper part communication hole 22a being formed in the upper part of the second partition member 22. Similarly, the upper communication path 61 is formed as a result of the upper end of the circulation space partition member 55 being disposed away from the member that forms the upper end of the interior portion space included in the main body portion 20; however, as illustrated in FIG. 12, the upper communication path 61 may be formed as a result of an upper part communication hole 55a being formed in the upper part of the circulation space partition member 55. Even if the upper communication path 28 or the upper communication path 61 is formed in this way, similarly, the heat exchanger according to the embodiments is able to improve the performance of heat exchange between the air and the refrigerant. For example, if the upper communication path 28 is formed by the upper part communication hole 22a, a step is formed between the upper end of the downwind side space 25 and the upper end of the upwind side space 24, and thus, in some cases, a liquid refrigerant retained in the upper part of the downwind side space 25 is not smoothly supplied to the upwind side space 24. The heat exchanger 5 according to the first embodiment described above is able to smoothly supply the liquid refrigerant from the downwind side space 25 to the upwind side space 24 as compared to a case in which the upper communication path 28 is formed by the upper part communication hole 22a because the upper end of the downwind side space 25 is flush with the upper end of the upwind side space 24. Similarly, the heat exchanger according to the second and the third embodiments described above is able to smoothly supply the liquid refrigerant from the downwind side space 59 to the upwind side space 58 as compared to a case in which the upper communication path 61 is formed by the upper part communication hole 55a. As a result, the heat exchanger according to the embodiments described above is able to improve the performance of heat exchange between the air and the refrigerant as compared to a case in which the upper communication path 28 is formed from the upper part communication hole 22a or a case in which the upper communication path 61 is formed from the upper part communication hole 55a.

Incidentally, in the heat exchanger according to the embodiments described above, the upper communication paths 28 and 61 are formed; however, the upper communication paths 28 and 61 need not always be formed. In this case, when the heat exchanger according to the embodiments is used as an evaporator, a gas-liquid two-phase refrigerant is supplied from the upwind side space 24 to the downwind side space 25 via the lower communication path 29, whereas a gas-liquid two-phase refrigerant is supplied from the upwind side space 58 to the downwind side space 59 via the lower communication path 29. Accordingly, the channel resistance of the gas-liquid two-phase refrigerant supplied from the refrigerant flow outlet/inlet space 23 to the downwind side space 25 is greater than the channel resistance of the gas-liquid two-phase refrigerant supplied from the refrigerant flow outlet/inlet space 23 to the upwind side space 24. As a result, the heat exchanger is able to increase the amount of the gas-liquid two-phase refrigerant supplied to the plurality of upwind side channels 44 as compared to the amount of the gas-liquid two-phase refrigerant supplied to the plurality of downwind side channels 45. Consequently, even in such a case, it is possible to allow the degree of dryness of the refrigerant passing through the heat exchanger 50 to be about 1.0, which is an ideal state. As a result, it is possible to suppress a decrease in the amount of heat exchanged between the air and the refrigerant.

As described above, the embodiment has been described; however, the embodiment is not limited by the described content. Furthermore, the components described above includes one that can easily be thought of by those skilled in the art, one that is substantially the same, one that is within the so-called equivalents. In addition, the components described above may also be appropriately used in combination. In addition, at least one of various omissions, replacements, and modifications of components may be made without departing from the scope of the embodiment.

REFERENCE SIGNS LIST 1 air conditioner
4, 5 heat exchanger
11 plurality of flat heat transfer tubes
12 header
13 header
20 main body portion
21 first partition member
22 second partition member
23 refrigerant flow outlet/inlet space
24 upwind side space
25 downwind side space
27 upwind side flow inlet/outlet port
28 upper communication path
29 lower communication path
42 flow direction
44 plurality of upwind side channels
45 plurality of downwind side channels
50 heat exchanger
51 header
53 upwind side partition member
54 downwind side partition member
55 circulation space partition member
56 heat transfer tube insertion space
57 circulation space
58 upwind side space
59 downwind side space
61 upper communication path
62 lower communication path
63 plurality of upwind side communication holes
64 plurality of downwind side communication holes
71 header
72 plurality of partition members
73 plurality of heat transfer tube insertion spaces

The invention claimed is:

1. A heat exchanger comprising:
a plurality of flat heat transfer tubes that are disposed in an area in which air flows; and
a header that is bonded to end portions of the plurality of flat heat transfer tubes, wherein
in an interior portion of each of the plurality of flat heat transfer tubes,
a plurality of upwind side channels, and
a plurality of downwind side channels disposed closer to a downwind side of the air than the plurality of upwind side channels are formed,
the header includes
a main body portion in which an interior portion space is formed,
a first partition member that divides the interior portion space into an upper part space, which is connected to the plurality of upwind side channels and the plurality of downwind side channels, and a refrigerant flow outlet/inlet space disposed in a lower part of the upper part space, and
a second partition member that divides an upwind side space located on a side closer to end portions of the plurality of upwind side channels in the upper part space and a downwind side space located on a side closer to end portions of the plurality of downwind side channels in the upper part space,
the first partition member is provided with an upwind side flow inlet/outlet port that supplies a refrigerant from the refrigerant flow outlet/inlet space to a lower part of the upwind side space and that discharges the refrigerant from the lower part of the upwind side space to the refrigerant flow outlet/inlet space, and
a lower part of the second partition member is provided with a lower communication path that communicates the downwind side space and the upwind side space.

2. The heat exchanger according to claim 1, wherein, at an upper part of the second partition member, an upper communication path that communicates the downwind side space and the upwind side space is further formed.

3. The heat exchanger according to claim 1, wherein
the header further includes
an upwind side partition member that divides an insertion space, in which the end portions of the plurality of upwind side channels and the end portions of the plurality of downwind side channels are disposed, in the upper part space and the upwind side space, and
a downwind side partition member that divides the insertion space and the downwind side space, and
in the upwind side partition member, a plurality of upwind communication holes that communicate the insertion space and the upwind side space are formed.

4. The heat exchanger according to claim 3, wherein, in the downwind side partition member, a plurality of downwind communication holes that communicate the insertion space and the downwind side space are formed.

5. The heat exchanger according to claim 3, further comprising a plurality of partition members that divides the insertion space into a plurality of spaces, wherein
the plurality of upwind communication holes allows the plurality of spaces to communicate with the upwind side space, respectively, and
in each of the plurality of spaces, an end portion of one of the plurality of flat heat transfer tubes is disposed.

* * * * *